ately or "United States Patent [19]

Shimizu

[11] Patent Number: 4,958,942
[45] Date of Patent: Sep. 25, 1990

[54] OIL SEAL ASSEMBLY
[75] Inventor: Shiro Shimizu, Osaka, Japan
[73] Assignee: Koyo Seiko Co., Ltd., Osaka, Japan
[21] Appl. No.: 409,696
[22] Filed: Sep. 20, 1989
[30] Foreign Application Priority Data
  Sep. 26, 1988 [JP] Japan .......................... 63-125530[U]
[51] Int. Cl.$^5$ ............................................ F16C 33/78
[52] U.S. Cl. ...................... 384/486; 277/39; 384/484
[58] Field of Search ............... 384/477, 484–486; 277/39

[56] References Cited
U.S. PATENT DOCUMENTS
1,420,416  6/1922  Dlesk .................................. 384/477
3,101,954  8/1963  Huddle ................................. 277/39

FOREIGN PATENT DOCUMENTS
1383004  11/1964  France ................................. 384/477
   6921   1/1981  Japan .................................. 384/484
2030236   4/1980  United Kingdom ...................... 384/484

Primary Examiner—Thomas R. Hannon

[57] ABSTRACT

An oil seal assembly has an inner annular member and an outer annular member which can rotate relative to each other and are disposed concentrically with each other to have a certain distance from each other in the radial direction. An elastic annular sealing member is bonded to the outer annular member and is in sliding contact with the inner annular member to form sealed annular cavities between the inner and outer annular members. The outer annular member has a cylindrical portion and an annular flange portion. The inner annular member has an inner cylindrical portion, an annular flange portion and an outer cylindrical portion. This outer cylindrical portion is concentric with the inner cylindrical portion to form a certain distance from the inner peripheral surface of the cylindrical portion of the outer annular member. The elastic annular sealing member has a plurality of seal lips which are bonded to the inner peripheral portion of the annular flange portion of the outer annular member. At least two of the lips are in sliding contact with the outer peripheral surface of the inner cylindrical portion of the inner annular member and the inner peripheral surface of the annular flange of the inner annular member, respectively. A narrow annular space is formed between the end face of the outer cylindrical portion of the inner annular member and the inner peripheral surface of the flange portion of the outer annular member.

12 Claims, 2 Drawing Sheets

OIL SEAL ASSEMBLY

BACKGROUND OF THE INVENTION

1. Field of the invention

The present invention relates to an oil seal assembly, particularly, to an oil seal assembly used for sealing an annular cavity formed between the inner and outer rings of a rolling bearing assembly, and interposed between the inner and outer rings of a rolling bearing assembly, particularly which are separable from each other.

2. Description of the Prior Art

There is a known oil seal assembly of this type, which is shown in FIG. 3. As shown in FIG. 3, the oil seal assembly is interposed between the inner ring (5) and outer ring (2) of a rolling bearing assembly (partially shown), which rotatably supports an axle (1), in order to separate an annular cavity (X) in the bearing from the environment (Y). (The rolling bearings used for an automotive wheel hub application are generally angular contact ball bearings or tapered roller bearings, of which inner and outer rings are separable from each other.) The oil seal assembly comprises an outer annular member (4) fitted onto the inner peripheral surface end portion of the outer ring (2) of the bearing assembly and having a single annular seal lip (3) on its inner peripheral surface and an inner annular member (6) fitted onto the outer peripheral surface end portion of the inner ring (5) of the bearing assembly and being in elastic-contact with the annular seal lip (3).

The outer annular member (4) comprises a cylindrical portion (4A) fixed onto the end portion of the inner peripheral surface of the outer ring (2), an annular flange portion (4B) extending from the outer end of the cylindrical portion radially inwardly, and a projecting portion (4C) projecting from the inner edge of the flange portion (4B) obliquely inwardly in the bearing axial direction. The annular seal lip (3) is bonded to the projecting portion (4C). The inner annular member (6) comprises a cylindrical portion (6A) fixed onto the end portion of the outer peripheral portion of the inner ring (5) and an annular flange portion (6B) extending from the inward end of the cylindrical portion radially outwardly.

The annular seal lip (3) bonded to the outer annular member (4) is in elastic-contact with the axial outward side face (Y side face) of the annular flange portion (6B) of the inner annular member (6).

In a rolling bearing assembly having the oil seal assembly of this type as a sealing means, the inner and outer rings sometimes need to be separated from each other in order to disassemble the bearing assembly when the bearing assembly is inspected or receives maintenance. In such a case, if the rings are separated from each other in the axial direction with the oil seal assembly being assembled to the bearing assembly, the annular seal lip (3) bonded to the outer annular member (4) is squashed by the annular flange portion (6B) of the inner annular member (6) or the inner annular member (6) deforms because of reaction force from the outer annular member (4), resulting in impossible reuse of the oil seal assembly. In such a bearing assembly, in order to disassemble the bearing assembly without damaging the oil seal assembly, it is necessary to dismount the oil seal assembly from the bearing assembly before disassembling the bearing assembly, with the result that the disassembling of the bearing assembly requires an extra operation and time.

SUMMARY OF THE INVENTION

The present invention has been made in view of the above-described situation and an object thereof is to provide an oil seal assembly which will be able to be dismounted from the outer ring of a rolling bearing assembly without being damaged and to be reused even though the inner and outer rings of the bearing assembly are separated from each other with the oil seal assembly being assembled to the bearing assembly.

In addition, it is also an object of the present invention to provide an oil seal assembly which will be interposed between the inner and outer rings of a rolling bearing assembly and will seal an annular cavity within the bearing assembly and will effectively separate the annular cavity from the environment and which will protect the bearing assembly from leakage and contaminants.

The invention will become more fully apparent from the following detailed description thereof taken in conjunction with the accompanying drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE INVENTION

An embodiment of the present invention will hereinafter be described in detail by reference to FIGS. 1 and 2.

Figure 1:
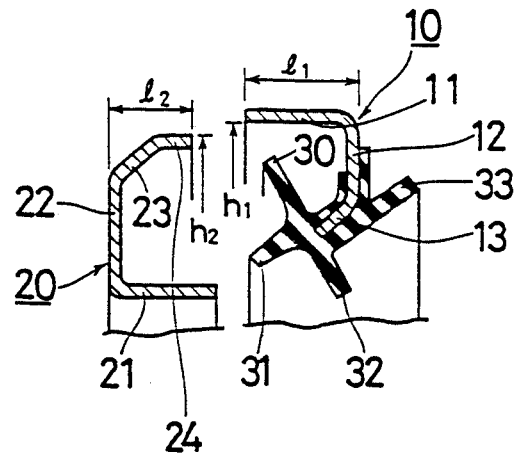
FIG. 1 is a longitudinal-sectional view showing an upper portion of a disassembled oil seal assembly of the present invention.

FIG. 1 shows a longitudinal-sectional view of an upper portion of an oil seal assembly as an embodiment. The oil seal assembly comprises two annular members, that is an outer annular member (10) and the inner annular member (20), made of metal plate and four annular seal lips made of rubber or a material like rubber bonded to one of the annular member (10). The four annular seal lips comprise a first annular seal lip (32), a second annular seal lip (31), a third annular seal lip (33), and a fourth annular seal lip (30).

Concretely, the outer annular member (10) has a cylindrical portion (11), an annular flange portion (12) extending from one end of the cylindrical portion (11) radially inwardly, and a projecting portion (13) projecting from the inner peripheral edge of the annular flange portion (12) obliquely inwardly in one bearing axial direction. The seal lips (30, 31, 32, 33) are bonded to the projecting portion, respectively. The inner annular member (20) comprises an inner cylindrical portion (21), an annular flange portion (22) extending from one end of the inner cylindrical portion (21), that is an end opposite to the end from which the annular flange portion (12) extends, radially outwardly, a projecting portion (23) projecting from an outer pheripheral edge of the annular flange portion (22) obliquely outwardly in one bearing axial direction, and an outer cylindrical portion (24) extending from an end of the projecting portion (23) concentrically with the inner cylindrical portion (21).

The bore diameter (h1) of the cylindrical portion of the outer annular member (10) is a little larger than the outside diameter (h2) of the outer cylindrical portion (24) of the inner annular member (20). And the axial directional length (l1) of the cylindrical portion (11) is a little longer than than the axial directional length (l2) of the outer cylindrical portion (24). The fourth annular seal lip (30) extends from the bonded portion of the projecting portion (13) of the outer annular member (10) toward the projecting portion (23) of the inner annular member (20). The second annular seal lip (31) extends therefrom toward the annular flange portion (22) of the inner annular member (20). The first annular seal lip (32) extends therefrom toward the inner cylindrical portion (21) of the inner annular member (20). And the third annular seal lip (33) extends therefrom toward the environment (Y) radially and obliquely outwardly.

Figure 2:
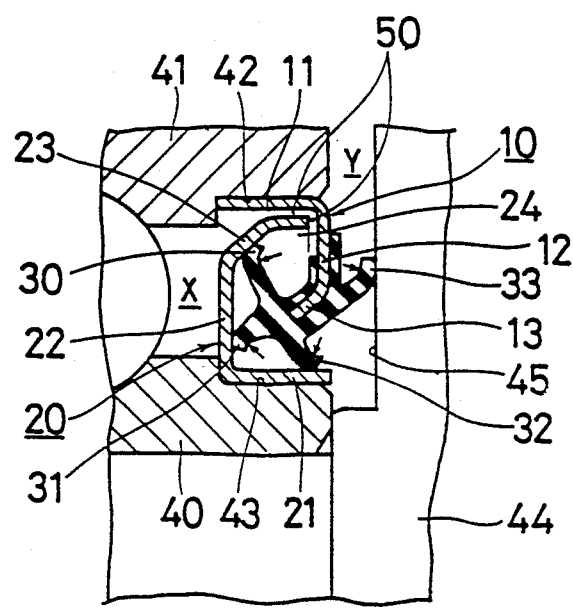
FIG. 2 is a longitudinal-sectional view showing an upper portion of an assembled oil seal assembly of the present invention.
Figure 3:
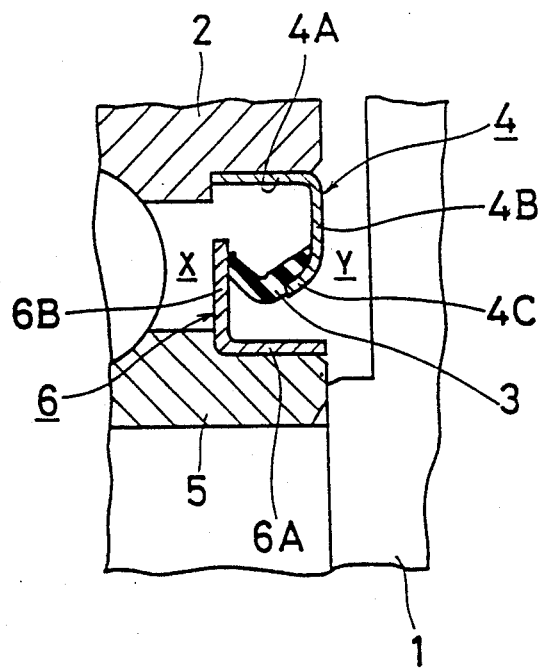
FIG. 3 is a longitudinal-sectional view showing an upper portion of an assembled oil seal assembly of the conventional art.

The oil seal assembly is interposed between the inner ring (40) and the outer ring (41) of a rolling bearing assembly which rotates relatively to each other via a plurality of rolling elements, for example as shown in FIG. 2. That is, the cylindrical portion (11) of the outer annular member (10) is fitted to a stepped portion (42) formed on the end portion of the inner peripheral surface of the outer ring (41) so that the end face of the projecting portion (13) of the outer annular member (10) faces an inner annular cavity (X) within the bearing assembly, and the inner cylindrical portion (210 of the inner annular member (20) is fitted to a stepped portion (43) formed on the end portion of the outer peripheral surface of the inner ring (40) so that the end face of the outer cylindrical portion (24) of the inner annular member (20) faces the environment (Y). The fourth annular seal lip (30), the second annular seal lip (31), the first annular seal lip (32) and the third annular seal lip (33) make elastic contact with, the projecting portion (23) of the inner annular member (20), the annular flange portion (22) thereof, the inner cylindrical portion (21) thereof and an end face (45) of an axle (44) to which the inner ring (40) is fitted, respectively.

In addition, a non-contact narrow sealing space (a labyrinth seal)(50), is formed between the inner peripheral surface of the portion in the neighborhood of the junction where the cylindrical portion (10) of the outer annular member (10) and the annular flange portion (12) thereof connect each other and the end face of the outer cylindrical portion (24) of the inner annular member (20) and between inner peripheral surface of the cylindrical portion (11) of the outer annular member (10) and the outer peripheral surface of the outer cylindrical portion (21) of the inner annular member (20), making a L-shaped profile.

According to the present invention, as described above in detail, the oil seal assembly can be prevented from being damaged when the inner and outer rings of a rolling bearing assembly having the oil seal assembly as a sealing means are separated from each other with the oil seal assembly being fitted to the bearing assembly for maintenance or inspection.

That is, since the distance between the outer annular member (10) and the inner annular member (20) in the axial direction is quite small because of the non-contact sealing space (50) formed between the outer annular member (10) and the inner annular member (20), then the outer annular member (10) and/or the inner annular member (20) make only a small amount of movement until they contact each other. Therefore, when the inner ring (40) and the outer ring (41) are separated from each other with the oil seal assembly being fitted to the bearing assembly, if the inner annular member (20) is displaced slightly by the amount of the distance between the outer annular member (10) and the inner annular member (20) in the axial direction by pulling the inner ring (40) out of the rolling bearing assembly to environment (Y) side in the axial direction, the tip of the outer cylindrical portion (24) of the inner annular member (20) contacts the inner peripheral surface of the portion in the neighborhood of the portion where the cylindrical member (11) of the outer annular member (10) and the annular flange portion (12) thereof connect to each other before the fourth, second and first seal lips (30, 31, 32) deform largely. If the inner annular member (20) is displaced to the environment (Y) side in the axial direction together with the inner ring (40), the outer annular member (10) is displaced together with the inner annular member (20) with a relative position between the annular members (10, 20) being kept, and then the outer annular member is disassembled from the outer ring (41). That is, since the relative position between the outer annular member (10) and the inner annular member (20) is kept unchanged after the annular members (10, 20) contact each other, the fourth, second and first seal lips will not deform largely and be damaged.

In addition, since the end face of the outer cylindrical portion (24) of the inner annular member (20) contacts the inner peripheral surface of the portion in the neighborhood of the portion where the cylindrical portion (11) and the annular flange portion (12) connect to each other when the inner ring (40) and the outer ring (41) are separated from each other, the outer annular member (10) will not be deformed by a force imposed when the inner annular member (20) is pulled out.

As apparent from the foregoing description, in a rolling bearing assembly having the oil seal assembly as a sealing member, since the oil seal assembly cannot be damaged, that is, the annular seal lips (30, 31, 32) are not squashed by being put between the outer annular member (10) and the inner annular member (20) and the inner annular member (20) is not deformed, when the rolling bearing assembly is disassembled, the inner and outer rings of the rolling bearing assembly can be separated from each other without removing the oil seal assembly from the bearing assembly and the oil seal assembly can be reused.

In addition, since the oil seal assembly of the present invention has a high sealing performance because of five sealing means, that is, the first annular seal lip, the second annular seal lip, the third annular seal lip, the fourth annular seal lip and the non-contact sealing space, the oil seal assembly can prevent the lubricant in the rolling bearing assembly from leaking and, at the same time, can prevent foreign materials from intruding into the cavity within the rolling bearing assembly.

While the present invention has been described in relation to the above exemplary embodiments it will be understood that various modifications may be made within the spirit and scope of the invention. While the objects of the present invention have been fully and effectively accomplished, it will be realized, however, that the foregoing exemplary embodiments have been shown and described for the purpose of illustrating the functional and structural principles of this invention and are subject to change without departure from such principles. Therefore, this invention includes all modifications encompassed within the spirit and scope of the following claims.

What is claimed is:

1. An oil seal assembly comprising inner and outer annular members rotatable relative to each other and disposed generally concentrically with each other with a certain distance therebetween, and an elastic annular sealing member bonded to said outer annular member and in sliding contact with said inner annular member to seal annular cavities between said inner and outer annular members, said oil seal assembly further comprising:

said outer annular member having a cylindrical portion and an annular flange portion extending from one end of said cylindrical portion radially inwardly, said inner annular member having an inner cylindrical portion, an annular flange portion extending from an inner end of said inner cylindrical portion, the inner cylindrical portion being opposed to said cylindrical portion of said outer annular member, and said inner annular member having an outer cylindrical portion extending from an outer peripheral surface of said inner annular flange portion in an axial direction and having a certain distance from an inner peripheral surface of said cylindrical portion of said outer annular member in the radial direction, said elastic annular sealing member having a plurality of seal lips bonded to the inner peripheral portion of said annular flange portion of said outer annular member, a first one of said seal lips being in slidable contact with at least an outer peripheral surface of said inner cylindrical portion of said inner annular member, a second one of said seal lips being in slidable contact with an inner peripheral surface of said annular flange portion of said inner annular member, and a third one of said seal lips extending in a direction generally perpendicular to the first seal lip and generally parallel to the second seal lip, said third seal lip further generally being positioned on an opposite side of the outer annular member than the second lip, and a narrow space being formed between an end face of said outer cylindrical portion of said inner annular member and the inner peripheral surface of said flange portion of said outer annular member.

2. The oil seal assembly according to claim 1, wherein said cylindrical portion of said outer annular member has a bore diameter being a little larger than an outside diameter of said outer cylindrical portion of said inner annular member and has an axial-directional length being a little longer than an axial-directional length of said outer cylindrical portion of said inner annular member.

3. The oil seal assembly according to claim 1, wherein said elastic annular sealing member further has a fourth seal lip being in slidable contact with an inner surface of the flange portion of said inner annular flange member.

4. The oil seal assembly according to claim 3, wherein the flange portion of the inner annular member further has an oblique projecting portion positioned at one end portion of the outer cylindrical portion, the other end portion of the outer cylindrical portion of the inner annular member having the certain distance from the inner peripheral surface of said cylindrical portion of said outer annular member.

5. The oil seal assembly according to claim 4, wherein the fourth seal lip is in slidable contact with the projecting portion of the inner annular member.

6. The oil seal assembly according to claim 1, wherein the flange portion of the inner annular member further has an oblique projecting portion positioned at one end portion of the outer cylindrical portion, the other end portion of the outer cylindrical portion of the inner annular member having the certain distance from the inner peripheral surface of said cylindrical portion of said outer annular member.

7. A rolling bearing assembly comprising:

an inner ring;

an outer ring disposed concentrically with said inner ring so that an annular cavity is formed therebetween said outer ring being readily separable from said inner ring;

a plurality of rolling elements disposed within said annular cavity for rotation of said rings relative to each other;

means for sealing said annular cavity, said sealing means includes an outer annular member fixed into the end portion of an inner peripheral surface of said outer ring, an inner annular member fixed onto the end portion of an outer peripheral surface of said inner ring, and an elastic annular sealing member bonded to said outer annular member and in slidable contact with at least said inner annular member to seal annular cavities between said inner and outer annular members;

said outer annular member having a cylindrical portion fitted to a stepped portion formed on the end portion of said inner peripheral surface of said outer ring, and an annular flange portion extending from an outer end of said cylindrical portion radially inwardly, said inner annular member having an inner cylindrical portion fitted to a stepped portion formed on the end portion of the outer peripheral surface of said inner ring, an annular flange portion extending from an inner end of said inner cylindrical portion radially outwardly, and an outer cylindrical portion extending from an outer peripheral portion of said annular flange portion extending in an axial direction and being concentric with said inner cylindrical portion and having a certain distance from an inner peripheral surface of said cylindrical portion of said outer annular member in the radial direction, said elastic annular sealing member having a plurality of seal lips bonded to the inner peripheral portion of said annular flange portion of said outer annular member, a first one of said seal lips being in slidable contact with at least an outer peripheral surface of said cylindrical portion of said inner annular member, and a second one of said seal lips being in slidable contact with an inner peripheral surface of said annular flange of said inner annular member and a third one of said seal lips being in slidable contact with an end face of a member attached to the inner ring and wherein the second and third seal lips extend in directions which are generally perpendicular to a direction in which said first seal lip extends and said third seal lip is generally positioned on an opposite side of the outer annular member than the second lip, and a narrow space being formed between an end face of said outer cylindrical portion of said inner annular member and the inner peripheral surface of said cylindrical portion of said outer annular member.

8. The rolling bearing assembly according to claim 7, wherein said cylindrical portion of said outer annular member has a bore diameter being a little larger than an outside diameter of said outer cylindrical portion of said inner annular member and has an axial-directional length being a little longer than an axial-directional length of said outer cylindrical portion of said inner annular member.

9. The rolling bearing assembly according to claim 7, wherein said seal lip being free of contact with the inner annular member and a fourth seal lip being in slidable contact with an inner peripheral surface of the outer cylindrical portion of said inner annular flange member.

10. The rolling bearing assembly according to claim 9, wherein the flange portion of the inner annular member further has an oblique projecting portion positioned at one end portion of the outer cylindrical portion, the other end portion of the outer cylindrical portion of the inner annular member having the certain distance from the inner peripheral surface of said cylindrical portion of said outer annular member.

11. The rolling bearing assembly according to claim 10, wherein the fourth seal lip is in slidable contact with the projecting portion of the inner annular member.

12. The rolling bearing assembly according to claim 7, wherein the flange portion of the inner annular member further has an oblique projecting portion positioned between an end portion of the outer cylindrical portion, the other end portion of the outer cylindrical portion of the inner annular member having the certain distance from the inner peripheral surface of said cylindrical portion of said outer annular member.

* * * * *